(12) United States Patent
Pfeffer

(10) Patent No.: US 9,491,598 B2
(45) Date of Patent: *Nov. 8, 2016

(54) METHODS AND APPARATUS FOR COMMUNICATING MESSAGES BETWEEN MOBILE COMMUNICATIONS DEVICES AND INTERNET ENABLED DEVICES

(71) Applicant: Time Warner Cable Enterprises LLC, New York, NY (US)

(72) Inventor: Howard Pfeffer, Reston, VA (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 18 days.

This patent is subject to a terminal disclaimer.

(21) Appl. No.: 14/075,835

(22) Filed: Nov. 8, 2013

(65) Prior Publication Data

US 2014/0066031 A1 Mar. 6, 2014

Related U.S. Application Data

(63) Continuation of application No. 13/240,462, filed on Sep. 22, 2011, now Pat. No. 8,634,809.

(60) Provisional application No. 61/481,515, filed on May 2, 2011.

(51) Int. Cl.
| | |
|---|---|
| *H04M 3/42* | (2006.01) |
| *H04W 4/14* | (2009.01) |
| *H04M 1/725* | (2006.01) |
| *H04L 12/58* | (2006.01) |
| *H04W 4/12* | (2009.01) |
| *H04N 21/4788* | (2011.01) |

(52) U.S. Cl.
CPC .............. *H04W 4/14* (2013.01); *H04L 51/066* (2013.01); *H04L 51/14* (2013.01); *H04M 1/72552* (2013.01); *H04N 21/4788* (2013.01); *H04W 4/12* (2013.01)

(58) Field of Classification Search
CPC ....... G06F 3/048; H04B 1/38; H04B 5/0031; H04B 5/02; H04B 5/0062; H04B 1/205; H04L 12/58; H04L 51/066; H04L 51/14; H04M 1/72552; H04N 21/4788; H04N 21/4227; H04W 4/12; H04W 4/14; H04W 12/02; H04W 12/06; H04W 4/008; H04W 4/02; H04W 8/005; H04W 28/14; H04W 88/04; H04W 12/04; H04W 12/12
USPC ...................................... 455/414.1
See application file for complete search history.

(56) References Cited

U.S. PATENT DOCUMENTS

| | | | |
|---|---|---|---|
| 2009/0210917 A1* | 8/2009 | Lafreniere | H04M 1/6505 725/106 |
| 2010/0192081 A1* | 7/2010 | Inoue et al. | 715/766 |
| 2011/0307932 A1* | 12/2011 | Fan et al. | 725/110 |
| 2012/0046052 A1* | 2/2012 | Fountain et al. | 455/466 |
| 2012/0180092 A1* | 7/2012 | Wong | H04N 21/4788 725/51 |

* cited by examiner

*Primary Examiner* — Timothy Pham
(74) *Attorney, Agent, or Firm* — Michael P. Straub; Stephen T. Straub; Ronald P. Straub

(57) ABSTRACT

Methods and apparatus for allowing a mobile device user to forward one or more messages which are received on the user's mobile device, to a television or a set top box are described. The user is able to view the forwarded messages on the television and can also reply to such received messages from the television. The methods and apparatus may be implemented using a message forwarding application installed on a user's cell phone and a server responsible for forwarding messages and replies between the user's Internet capable TV or set top box and mobile telephone. To the party sending a message, replies appear to have originated from the user's cell phone making the use of the service transparent to individuals other than the user to which the message is sent. Message received and sent logs are maintained in the user's phone so the message record is complete.

20 Claims, 7 Drawing Sheets

METHODS AND APPARATUS FOR COMMUNICATING MESSAGES BETWEEN MOBILE COMMUNICATIONS DEVICES AND INTERNET ENABLED DEVICES

RELATED APPLICATIONS

The present application is a continuation of U.S. patent application Ser. No. 13/240,462 filed Sep. 22, 2011 which is hereby expressly incorporated by reference in its entirety, and which claims the benefit of the filing date of U.S. Provisional Application Ser. No. 61/481,515 filed on May 2, 2011.

FIELD OF THE INVENTION

The present invention relates to methods and apparatus which support and facilitate communicating messages, e.g., SMS and/or MMS messages, directed to a mobile communications device of a user, via another communications device, e.g., an Internet television (TV) or other Internet capable device corresponding to the user.

BACKGROUND OF THE INVENTION

When at home, it is common for mobile phone users to not always carry their mobile phones, e.g., in hand, pocket etc., as they otherwise do when outside or while traveling. Sometimes the users even leave their mobile phones in a room plugged in for battery charging while they watch TV in a different room, or even in the same room. Thus at times the mobile phone user may not always be carrying the mobile phone when at home, or may intentionally not keep it handy. This may often occur during periods of TV watching. As a result, a mobile phone user may not have their mobile phone handy at all times and may be made aware of messages considerably later than if they had their telephone with them when a message was received.

Accordingly, while watching television, a mobile device user may miss messages received on the mobile device, especially when the mobile phone is kept at a farther distance or in a different room as the user will likely miss the cell phone alert signals, e.g., ringtone and/or vibration. Some messages received on the user mobile phone may be time sensitive which the user may not wish to miss. In such situations, and various other situations as well, it would be desirable to be able to receive the alerts and/or the messages, received on the user's mobile phone, on the television display itself.

In view of the above discussion, it should be appreciated that there is a need for methods and/or apparatus which would allow a mobile phone user to receive messages directed to the user's mobile phone when watching television even if the mobile phone is not readily available. It would desirable if a user could be made aware of new messages while watching television and provided an opportunity to respond to an incoming message without having to do so from his or her mobile telephone.

SUMMARY OF THE INVENTION

Methods and apparatus for using a television device to inform a user of a mobile communications device of an incoming message, present the message, and/or respond to the message are described. The methods and apparatus are well suited for use with Internet capable televisions and mobile communications devices such as mobile telephones.

The method and apparatus support and facilitate communicating messages, e.g., SMS and/or MMS messages, between a mobile devices including, e.g., cell phones, and Internet enabled display device, e.g., internet television (TV), etc. In accordance with the invention, a mobile phone user is presented with the ability to view one or more messages received on the users cell phone on his/her television display screen. In addition the user can send a reply to a message received on the user's cell phone.

The methods and apparatus described herein can be implemented using a cell phone application, sometimes referred to as a cell phone app, which forwards received messages, e.g. SMS and/or MMS messages, to a server in the network. The messages are sent to and displayed on the user's Internet capable television. In some embodiments, the messages are forwarded for display to the appropriate television based on telephone number to Internet television address mapping information stored in the server used to perform message forwarding. In other embodiments, the telephone application of the user includes the Internet address and/or other address information used to identify and/or route the message to the user's Internet enabled telephone.

After forwarding of the message on the user's Internet television, e.g., located at the customer premise corresponding to the user of the mobile phone which received the message, the user is provided an opportunity to respond to the message via the user's Internet capable television.

The user may respond to the received message by sending a response message, via the user's Internet television, to the sender of the received message. The Internet television generates the response message from input received from the user, e.g., via a wireless television remote control or another television input device or interface. The reply message is processed by the telephone application of the present invention on the user's mobile telephone which then sends a reply message, e.g., an SMS or MMS message, to the telephone of the message sender from which the original message was received.

Thus, a user of a mobile phone number can receive messages which were sent to the user's mobile telephone and respond to the messages via an Internet capable television and a cell phone application running on the user's cell phone.

From the perspective of the original message sender, the reply message appears as it would if it was sent directly by the user from the user's mobile cell phone. In addition, since messages are received and replied to through the use of the user's mobile telephone, the message log on the telephone includes received and sent message as it would if the user received and replied to message.

The methods and apparatus of the present invention may be offered to a user as part of a combined service package, e.g., a mobile telephone and cable television or Internet data package.

Various additional features and advantages of the present invention are discussed in the detailed description which follows.

DETAILED DESCRIPTION

Figure 1:
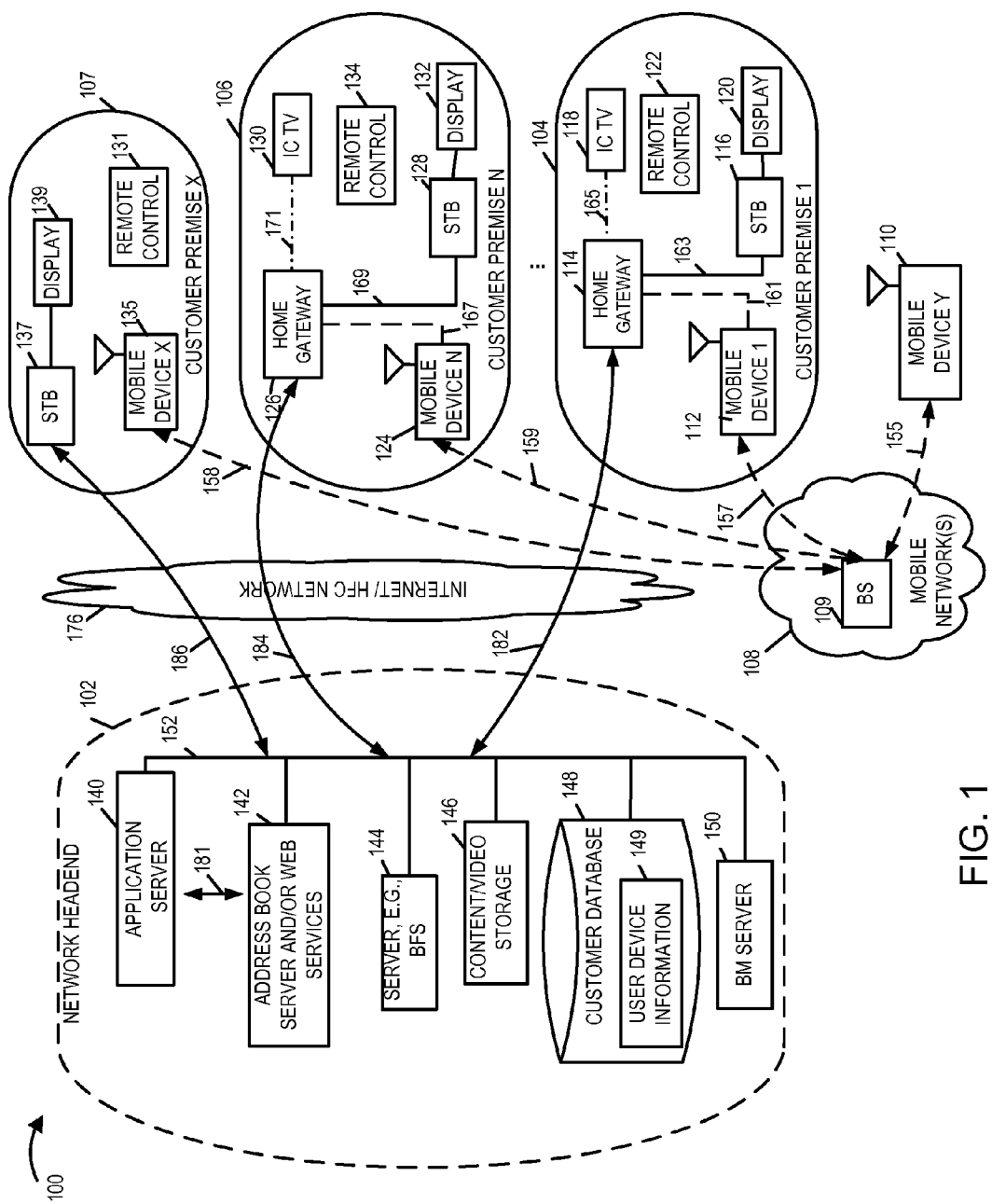
FIG. 1 illustrates an exemplary system implemented in accordance with the present invention.

FIG. 1 illustrates an exemplary system 100 implemented in accordance with one exemplary embodiment of the present invention. The system 100 shown in FIG. 1 supports communication of messages, e.g., text and/or multimedia messages, between mobile devices including, e.g., cell phones, and home devices such as, e.g., internet capable TVs, or a set top box. The system 100 includes a network headend 102, a cable network 176, e.g., a hybrid fiber-coaxial (HFC) network and/or internet, a plurality of customer premises 104, 106 in addition to mobile network(s) 108, and at least one mobile communications device, e.g., mobile phone Y 110. In the discussion, mobile devices are also referred to as cell phones or mobile stations (MS). In various embodiments the mobile devices such as mobile device 1 112, mobile device N 124 support WiFi connectivity and signal exchange via wireless LAN.

The network headend 102 may be implemented at a cable network office or site including multiple servers and databases which are coupled together. In the FIG. 1 example, the headend 102 includes an application server 140, an address book server and/or web services 142, a server 144, e.g., a broadcast file server (BFS), content storage 146, a customer database 148, a business management server 150. The network headend 102 is shown using dashed lines as it is an optional element of the system 100. Thus, it should be appreciated that various servers and/or elements shown to be included in the headend 102 may reside outside the headend 102 in some embodiments and may be located anywhere in the system 100, e.g., in a distributed manner. For example the application server 140 and the address book server 142 may, and in some embodiments are, located outside the network headend 102. In the FIG. 1 example, various servers and other elements included in the headend 102 are coupled together by a communications link 152. These servers and elements are coupled via the communications link 152 to the cable network 176, e.g., HFC network and/or internet. The mobile network(s) 108 includes one or more base stations (BS) 109 for transmitting to and/or receiving signals from mobile devices such as mobile devices 110, 112 and 124, as indicated by dashed links 155, 157 and 159. Thus in various embodiments the communications between various from mobile communications devices such as mobile devices 110, 112, and 124 is facilitated by one or more base stations, e.g., such as BS 109.

Via the cable network 176, the elements shown in the network headend 102 can send and/or exchange various information with the devices located at the customer premises 104, 106, and 107. The devices located at the customer premises 104, 106 are coupled to the cable network 176 via the home gateways 114, 126 as shown. Each customer premise 104, 106 respectively includes a home gateway device 114, 126, a set top box (STB) 116, 128 and a display device 120, 132 which could be, e.g., standard television. It should be appreciated that each of the STBs 116, 128 can be integrated in a device which also includes a display. The STBs support video, audio and optionally, E-mail functionality. In some embodiments the STBs 116, 128 are IP capable set top box devices, e.g., STBs which support IP (internet protocol) and communications over the internet. The STBs 116, 128 can be used to send information to the network headend 102 in addition to receiving content, and other programming content and/or information from the headend 102. In addition, each customer premise 104, 106 respectively includes an internet capable TV (IC TV) 118, 130; a remote control 122, 134 and a mobile device, e.g., mobile device 1 112, and mobile device N 124 respectively. The home gateways 114, 126 in some embodiments are e.g., cable modems. As shown in the figure, the set top boxes 116, 128; IC TVs 118, 130; and the mobile devices 1 112, N 124 are coupled to their respective home gateways 114, 126. The coupling of the customer premise devices to the home gateways is shown using different lines representing links. Links 161, 167 which couple the mobile devices 112, 124 to the home gateways 114, 126 are wireless links, e.g., Wi-Fi links. The links 163, 169 represented by solid lines are normally wired links, e.g., Ethernet. The links 165, 171 could be wired or wireless, e.g., Ethernet, MoCA, Wi-Fi, etc. Customer premise 107 includes a STB 137 coupled to a display device 139, a mobile device 135, and a remote control. The STB 137 in some embodiments is an analog set top box device.

As shown in FIG. 1, communications link 182 traversing the cable network (e.g., internet) 176 couples the home gateway 114 to the various elements/servers shown in the network headend 102. Similarly, home gateway 126 in the customer premise N 106 is coupled to the various elements/servers shown in the network headend 102 via link 184 which traverses the cable network 176. Communications link 186 traversing the cable network 176 couples the STB 137 to the various elements/servers shown in the network headend 102 as shown in the Figure.

The internet capable TVs 118, 130 include internet browsing functionality and often do have set top box capabilities and functionalities built into them. Thus the users at customer premise 104, 106 can browse the web and receive programming content through the IC TVs 118, 130. In accordance with one feature, in addition to the STBs 116, 128, and 137, the IC TVs 118, 130 can also communicate and exchange information with the application server 140 over the cable network 176. The users at customer premise 104, 106 can control, configure and/or provide input to the IC TVs 118, 130 and to the STBs 116, 128 via the remote control units 122 and 134 respectively. Similarly, a user at customer premise 107 can control, configure and/or provide input to the STB 137 via the remote control unit 131. Additionally, the STBs 116, 128 as well as the IC TVs 118, 130 may, and often do, include DVR functionality and the storage of user selected content, e.g., data and/or video, and audio content. Although not shown, customer premise 104, 106 may also include additional STBs and display devices.

In accordance with one aspect of the invention the application server 140 receives, from one or more internet capable TVs, e.g., IC TV 118, or set top boxes, e.g., STB 116, corresponding to a customer, a request for messages, e.g., SMS and/or MMS messages received on the mobile device associated with the customer, e.g., mobile device 112. For example, the request for messages is a request from IC TV 118 to the application server 140 to forward messages received by the application server 140 from the user's mobile device 1 112. In accordance with one feature of some embodiments, the application server 140 receives a copy of messages such as SMS or MMS message(s) received on the customer's mobile device 1 112, performs a matching operation to obtain information corresponding to the sender of the messages, and forwards the message(s) along with the obtained matching information to the IC TV 118 that requested for said messages. To obtain information corresponding to the sender of the messages the application server 140 may send/receive information to/from the address book server and web services 142, as shown using arrow 181. In various embodiments the forwarded message is sent from the application server 140 to the IC TV 118 and/or to the STB 116, for display on a corresponding television display. Display 120 corresponds to the STB 116 while a television display device is included in the IC TV 118. Thus, as will be discussed in greater detail, in various embodiments a customer is able to view messages, sent to his/her mobile device, on a display device, e.g., a television.

The BFS 144, among other things, is responsible for delivering programming content and/or other information to one or more customer STB devices including the STB 116. Customer database 148 includes customer information, e.g., customer account, customer subscription information, customer device capability and other billing related information. Customer database 148 also includes customer/user device information 149 which is the information regarding customer devices, e.g., STBs, home gateway devices, e.g., cable modems etc., installed at various customer premises served by the network headend 102. The customer/user device information 149 includes, for example, customer identification and/or device identification information corresponding to the STBs, IC TVs, and home gateway devices installed at customer premise 104, 106. BM (Business management) server 150 processes billing information corresponding to customers serviced by the network headend 102.

Figure 2:
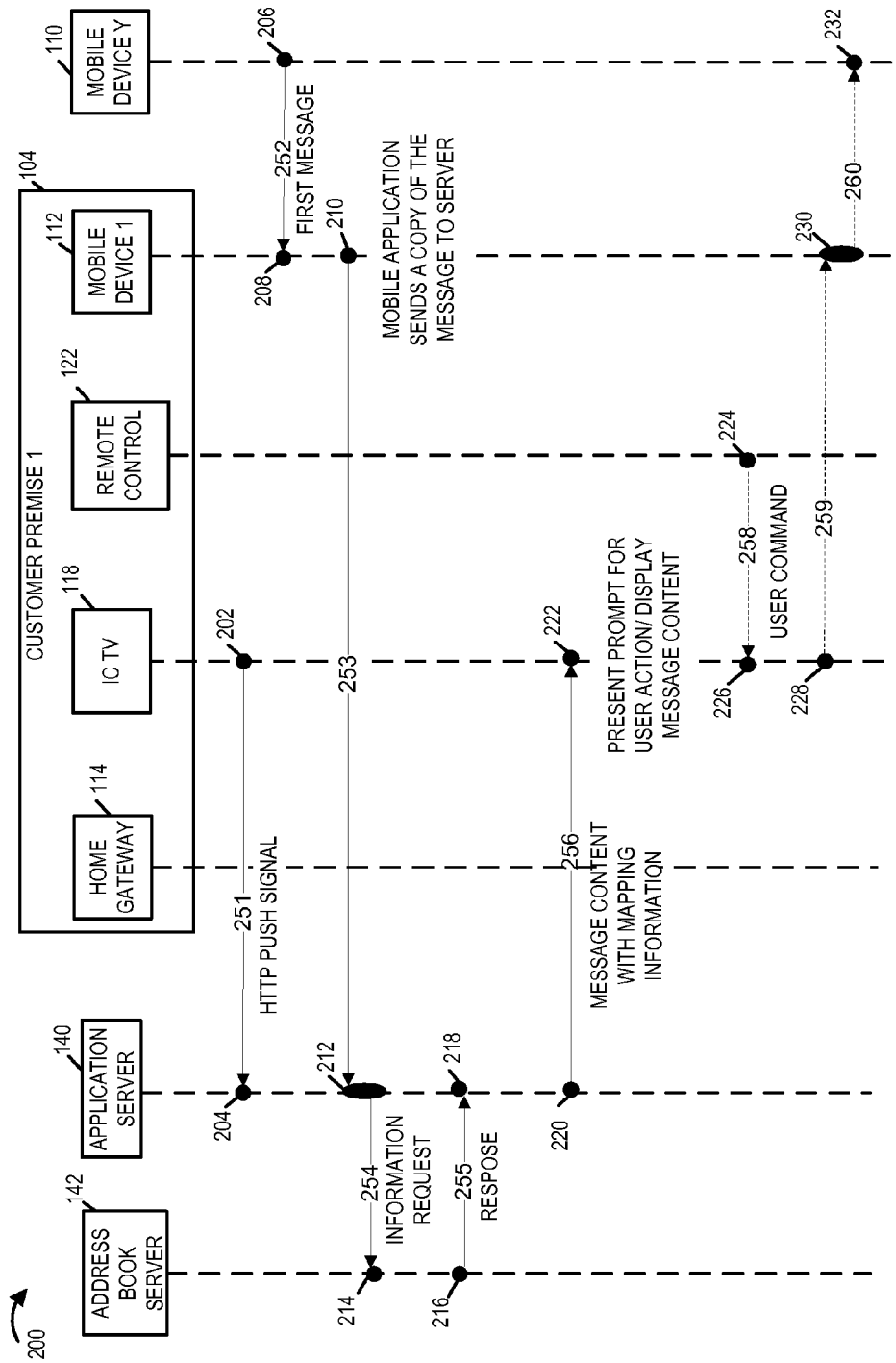
FIG. 2 illustrates signaling performed in accordance with one exemplary embodiment implemented using the system shown in FIG. 1.

Having generally discussed the exemplary system shown in FIG. 1, an exemplary method will now be discussed in detail with regard to the example shown in FIG. 2. Elements of the system 100 shown in FIG. 1 which participate in the method being explained in the FIG. 2 example are shown at the top of FIG. 2 and bear the same reference numbers as used in FIG. 1. Messages, information, content and/or signals communicated between devices are represented in FIG. 2 using arrows.

At the top of FIG. 2, various elements 200 of the system 100 which may participate in facilitating communication of one or more messages from a user mobile device, e.g., mobile device y 110, to a customer home device such as an IC TV (or a Set Top Box) located at the customer premise 104, e.g., customer home, in accordance with one embodiment of the invention, are shown. The illustrated components 200 include, a mobile device Y 110, mobile device 1 112, IC TV 118, home gateway 114, remote control 122, application server 140 and address book server 142.

FIG. 2, illustrates the steps and associated signaling used in one exemplary embodiment where a user of a mobile communications device (MS) Y 110 sends a first message, e.g., an SMS or MMS, to the user of mobile device 1 112 and the first message received on the user mobile device 1 112 is forwarded to the IC TV 118 for display, via the home gateway device 114 in accordance with the invention. However it should be appreciated that the message received on the user mobile device 1 112 may be, and in some embodiments is, forwarded to the STB 116 for display on the television display 120 coupled to the STB 116. In accordance with one aspect the various steps illustrated in the FIG. 2 example, e.g., relating to forwarding of the messages from the mobile device 1 112 to the IC TV 118 for display, are implemented when the mobile device 1 112 is located at the customer premise 104, e.g., customer home. This is discussed below in greater detail. The mobile device 1 112 may belong to the same primary customer to whom the IC TV 118 belongs or to another member of the customer home 104, however this is not necessary in all embodiments.

At times it may be desirable to be able to read and respond to messages received on the mobile device 1 112 even when the mobile device 1 112 is not handy. For example when the user of mobile device 1 112 is watching some program content over the television (e.g., IC TV 118 or display 120 coupled to STB 116) and the mobile device is in a different room, and/or the mobile device 1 112 is plugged in for battery recharge while the user is watching TV. In accordance with one feature of the invention, the mobile device 1 112 includes an exemplary message forwarding application which when activated allows the user of mobile device 1 112 to forward one or more messages received on the mobile 1 112 to a home device such as the IC TV 118 or the STB 116 for display to the user, via the home gateway device 114. It should be appreciated that the mobile device 1 112 is capable of wirelessly connecting and communicating, e.g., through Wi-Fi, Bluetooth, etc., with the home gateway device 114 and thus home gateway device 114 can route one or more messages from the mobile device 1 112 to the IC TV 118 or the STB 116 which are also coupled (wired or wirelessly) to the home gateway 114. Furthermore, in accordance with one aspect of the invention the IC TV 118 includes an exemplary TV application which allows the IC TV 118 to receive messages via the gateway device 114.

The process starts in step 202 where the TV application on the IC TV 118 initiates an HTTP push connection to application server by sending a request for messages (shown as signal 251) to the application server 140. In various embodiments the request for messages is, e.g., a long poll request, XML HTTP request, etc. The long poll request 251 is sent when the TV application is activated on the IC TV 118. The request is received by the application server 140 in step 204 and stays pending with the application server 140 until the application server 140 receives a message, corresponding to the pending long poll request. The application server 140 may include a record, e.g., stored information, which maps various user devices such as the IC TVs, STBs and mobile devices associated with a customer, to customer identification information, e.g., customer account number. For example, the application server 140 may store information that links various devices such as the IC TV 118, STB 116, home gateway 114 and mobile device 1 112 located at the customer premise 104, with a customer account number that corresponds to the customer/user at customer premise 104. It should be appreciated that in various embodiments the various requests, messages and/or responses are sent/received by the IC TV 118 through the home gateway device 114 which serves as an access point, e.g., providing access to the cable network 176, e.g., internet, over which the messages, requests and/or responses are communicated.

To facilitate better understanding of the exemplary method illustrated in the FIG. 2, consider one simple example where the user of mobile device 1 112 receives a first message 252, e.g., an SMS, MMS etc., from a friend, e.g., user of mobile device Y 110. This is illustrated in steps 206 and 208. The first message 252 is sent from the mobile device Y 110 in step 206 and is received by the MS 1 112 in step 208. Although not shown, it should be appreciated that communications of messages between the mobile devices MS Y 110 and MS 1 110 is facilitated in some embodiments through one or more mobile networks including base station(s) such as mobile network(s) 108 including base station 109. In some embodiments the messages can be communicated directly between mobile devices in a peer to peer manner. For the purpose discussion, consider that the mobile device 1 112 is located at the customer premise 104 when the first message 252 is received in step 208, that the message forwarding application is activated on the mobile device 1 112, and that the TV application is activated on the IC TV 118.

Following the receipt of the first message 252 in step 208, in accordance with the invention the message forwarding application in mobile device 1 112 forwards a copy (message 253) of the first message 252 to the application server 140. This is illustrated in step 210. In some embodiments the copy 253 of the first message is sent to the application server 140 over the internet via the home gateway device 114. In various embodiments the mobile device 1 112 includes message forwarding control information which is used by the message forwarding application on mobile device 1 112 to forward the copy of the first message to the application server 140. The message forwarding control information in some embodiments is stored by the user in the mobile device 1 112, e.g., as part of configuring the message forwarding application on mobile device 1 112. In at least one embodiment the message forwarding control information includes the address of the application server 140 as the destination address for forwarding one or more messages received on mobile device 1 112 in accordance with one embodiment of the invention. In some embodiments the message forwarding control information also indicates when one or more messages received by the mobile device 1 112 are to be forwarded. In some embodiments the message forwarding control information also indicates at least one time period during which one or more messages received by the mobile device 1 112 are to be forwarded, for example, forward received messages between 7:30 PM-9:30 PM during weekdays, between 6:00 PM-11:00 PM during weekends, etc. It should be appreciated that at least some of the message forwarding control information can be easily modified or changed by the user as per the user's desire/preference.

The application server 140 receives the forwarded copy 253 of the first message in step 212 and processes the received message. In various embodiments processing of the message 253 includes checking the identification information corresponding to the original sender, e.g., phone number of the mobile device Y 110 which sent the first message 252, to determine if the application server 140 has some additional information, e.g., such as a name, a picture, ICON, location, map, web page, etc., corresponding to the sender of the first message 252. Some such information may already be stored in the application server 140, e.g., due to searches or look up performed by the application server 140 using the phone number of the mobile device Y 110. In some embodiments when the additional information corresponding to the original sender, e.g., mobile device Y 110, is not already available to the application server 140, the processing in step 212 includes sending a request 254 from the application server 140 to the address book server and/or web services 142 to provide some additional information regarding corresponding to the user of mobile device Y 110. The request 254 for information is received by the address book server and/or web services 142 in step 214. Following the receipt of the request for information, in step 214 the address book server and/or web services 142 performs the matching operation, e.g., by checking an address book database with information corresponding to various phone numbers, and/or by performing an internet search for any information corresponding to the sender's contact information, e.g., phone number, available over the internet. The information being searched may include, for example, a name, a picture, ICON, location, map, web page, content of a social media website etc., corresponding to the phone number of mobile device Y 110. In some embodiments map the sender's contact information included in the forwarded message 253 may include the first name of the use of mobile device Y 110 in addition to the phone number of mobile device Y 110. Thus in some such embodiments the address book server 142 uses the combination of name and phone number to look up for other additional information, e.g., a picture, ICON, location, map, web page, etc., corresponding to the user of mobile device Y 110.

After performing the matching operation to obtain the requested information, the address book server and/or web services 142 sends a response message 255 to the application server 140 in step 216. The response message 255 includes the retrieved information corresponding to the original sender of the first message 252. The application server 140 receives the response message 255 in step 218. In some embodiments the message exchange (e.g., shown using arrow 181) between the application server 140 and the address book server and/or web services 142 is over the internet.

In step 220, after having obtained information corresponding to the original sender of the first message 252, i.e., the user of mobile device Y 110 in this example, the application server 140 sends a response message 256 including the content of the first message 252 along with the mapping information corresponding to the original sender, to the IC TV 118 via the home gateway 114. The message 256 is in response to the HTTP long-poll request 251. Thus the application server 140 in some embodiments acts as a message forwarding server, that receives messages forwarded by the user mobile device 1 112 and then forwards them, optionally along with additional mapping information, to the IC TV 118.

It should be appreciated that the response message 256 is communicated to the IC TV 118 through the home gateway 114. The response message 256 is first received by the home gateway 114 over the cable network 176. Next the response message 256 is communicated from the home gateway 114 to the IC TV 118, e.g., over a wired or wireless connection. Thus it should also be appreciated that communications path for information including messages, signals, etc., from the application server 140 to the home gateway 114 may, and in some embodiments is, different than the communication path for the information from the home gateway 114 to the IC TV 118.

The response message 256 is received and processed by the TV application in the IC TV 118 in step 222. As part of the processing performed in step 222, a prompt is presented/displayed on the IC TV 118 to the user at customer premise 104 requesting the user to take action, e.g., to view the received message content, store for later viewing, decline to view etc. For example, the presented prompt may read, e.g., "MESSAGE RECEIVED-SELECT YES TO VIEW THE MESSAGE NOW OR NO TO STORE". Thus the user at customer premise 104 is alerted regarding the incoming message even though the user is away from the mobile device 1 112, and if the user chooses to, the received message may be viewed on the IC TV 118. In some embodiments the user at customer premise 104 is prompted to enter a password or pin in order to view the received message. The configuration settings regarding the presentation of one or more received messages on the IC TV118 can be changed as per the user's preference. In such embodiments, prior to displaying the content of the received message, a check is performed by the TV application on IC TV 118 to verify whether the password or pin entered by the user to view the received message is correct. Further in step 222, the content of the first message 252 is displayed on the IC TV 118 along with other information, e.g., name and/or picture, icon etc., corresponding to the sender, e.g., user of mobile device Y 110.

After displaying the message, the IC TV 118 waits for a user command to perform further processing regarding the message. In some embodiments when no user command or instructions is detected the IC TV 118 automatically stores the content of the first message 252 displayed to the user. The user at customer premise 104 can later find the message in a message inbox directory on the IC TV 118.

The signals/messages shown using dashed arrows correspond to optional steps 224, 228 and 230 and thus some of such steps may be performed or skipped in various embodiments. For the purpose of FIG. 2 example, consider that the optional steps 224, 228 and 230 are performed. In step 224, after having viewed the message displayed on IC TV 118 in step 222, the user sends a user input signal 258, e.g., a command, via the remote control 122 to control the TV application on IC TV 118. The command 258 may instruct the TV application to, for example, store the received message and return to the previous screen; delete the received message, store the message and open a window for the user to compose a reply message, etc. The IC TV 118 receives the command in step 226 and acts according to the instruction. Steps 228 and 230 are performed in the event when the user at customer premise decides to reply to the received message which is displayed. For the purpose of discussion, consider that the user at customer premise 104 wishes to write a reply in response to the received first message 252. Thus upon receiving the command in step 226 the IC TV 118 opens a window on the TV 118 screen for the user to compose the reply message. In some embodiments the user composed reply message is received as part of the user input 258. The reply message is accepted by the IC TV 118 in step 226 and is used to generate a first response message 259 to be sent to mobile device 1 112.

Next in step 228 the first response message 259 composed by the user at customer premise 104 is sent from the IC TV 118 to the mobile device 1 112. Although not shown in FIG. 2, it should be appreciated that the first response message 259 is communicated from the IC TV 118 to the mobile device 1 112 through the home gateway 114. Thus the reply message 259 first goes from the IC TV 118 to the home gateway device 114 and then from the home gateway 114 to the mobile device 1 112, e.g., over the wireless LAN connection 161. The mobile device 1 112 receives the first response message 259 in processing step 230. Following the receipt of the response message 259 the mobile device 1 112 performs processing in step 230. The processing in step 230 includes, for example, putting the received first response message 259 in a format suitable for transmission from the mobile device 1 112 to the mobile device Y 110, e.g., over one or more mobile networks. In some embodiments the first response message 259 is communicated from the IC TV 118 to the home gateway 114 using a communications protocol which is different than the communications protocol used for sending the response message 259 from the home gateway 114 to the mobile device 1 112. As part of the processing in step 230, a second response message 260 is generated by the mobile device 1 112 from the received reply message 259. The second response message 260 includes at least some content from the reply message 259, e.g., the content of the message composed by the user, and indicates the user's mobile device 1 112 as the source of the second response message 260. In some embodiments the second response message 260 is in a different format than the reply message 259. Further in step 230 the second response message 260 is transmitted over the air to the mobile device Y 110. The mobile device Y 110 receives the second response message in step 232. In some embodiments one or more messages are communicated to/from the IC TV 118 from/to the home gateway 114 over standard multimedia over Coaxial (MoCA).

Figure 3:
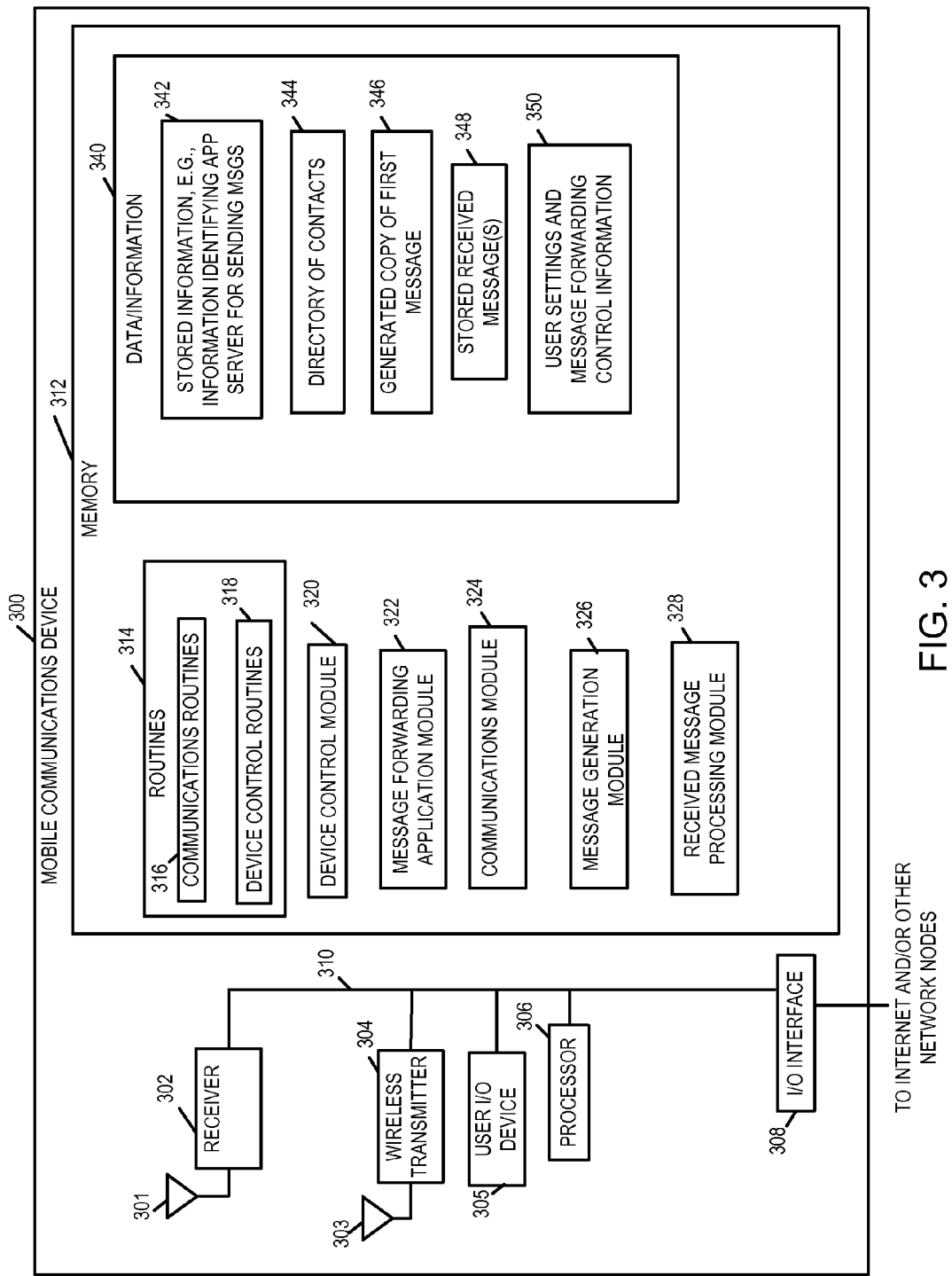
FIG. 3 illustrates an exemplary mobile communications device which can be used to implement at least some steps discussed in the FIG. 2 example, in accordance with one aspect of the invention.

FIG. 3 is a drawing of an exemplary mobile communications device 300 which may be used as any one of the mobile devices shown in the system of FIG. 1, in accordance with an exemplary embodiment. For the purpose of discussion consider that the exemplary mobile communications device 300 is used as the mobile device 1 112 corresponding to the user at customer premise 104 and implements one or more steps discussed above with regard to FIG. 2 example. In some embodiments the mobile communications device 300 is a cellular mobile telephone, e.g., a handheld mobile station.

As shown in FIG. 3, exemplary mobile communications device 300 includes a receiver 302, a transmitter 304, user I/O devices 305, a processor 306, I/O interface 308 and memory 312 coupled together via a bus 310 over which the various elements may interchange data and information. The transmitter 304, e.g., a wireless transmitter, transmits various signals, e.g., SMS/MMS messages, voice data, and/or other signals. Wireless transmitter 304 is coupled to transmit antenna 303 via which the mobile communications device 300 transmits the various signals to other devices. In some embodiments, the same antenna is used for the receiver and the transmitter.

Receiver 302 is responsible for receiving signals from other devices. In some embodiments the receiver 302 includes a wireless receiver module and is coupled to a receive antenna 301 via which the mobile communications device 300 receives signals from other devices. The received signals include a first message, e.g., and SMS or MMS message received from another mobile device such as mobile device Y 110, a response message composed by the user, received from IC TV 118 etc. The received messages are sometimes stored in the mobile device memory 312 as stored received message(s) 348. User I/O devices 305 include, e.g., microphone, keypad, keyboard, switches, speaker, display, etc. User I/O devices 305 allow a user of the mobile communications device 300 to input data/information, access output data/information and control at least some functions of the mobile device 300. The mobile communications device 300 in some embodiments also includes a camera capable of capturing images and/or recording videos.

Memory 312 includes routines 314, various modules and data/information 340. The processor 306, e.g., a CPU, executes the routines 314 and one or more modules discussed below and uses the data/information 340 to control the operation of the mobile communications device 300 to implement one or more steps, e.g., one or more steps discussed in the FIG. 2 example.

Routines 314 include a communications routine 316 and device control routines 318. The communications routine 316 implements the various communications protocols used by the mobile communications device 300. The mobile communications device 300 supports at least two different communications protocols, one of said communications protocols being a cellular network communications protocol (e.g., CDMA or GSM) and a second one of the communications protocols being a WAN (Wide Area Network) communications protocol (e.g., WiFi), LAN (Large Area Network) communications protocol or PAN (Personal Area Network) protocol (e.g., Bluetooth).

The device control routines 318 are used by the control module 320 to control the operation of various elements of the mobile communications device 300. Modules included in the memory 312 include an application module 322, e.g., a message forwarding application, a communications module 324, a message generation module 326 and a received message processing module 328. The application module 322 includes the message forwarding application used by the mobile communications device 300 for forwarding one or more messages such as SMS, MMS, etc., received from other mobile devices, to the application server 140 in accordance with the invention. When activated, the application module 322 controls the mobile device 300 to generate a copy of one or more received messages from other devices and send the message copy to the application server 140. In some embodiments the application module 322 controls the transmitter 304 to send a copy 253 of the first message 252 received by mobile device 300 from mobile device Y 110, to the application server 140 via the home gateway 114. In some embodiments, although routed via the home gateway 114, the copy 253 of the first message 252 sent to the application server 140 includes the IP address corresponding to the application server 140 as the destination address.

The application module 322 can be programmed by the user of mobile device 300 to define user settings related to message forwarding application. The user settings include message forwarding control information set by the user, and are stored in the memory 312. The message forwarding control information 350 indicates: when messages received by the mobile device 300 are to be forwarded, at least one time period during which received messages are to be forwarded. The control information also indicates one of message forwarding being enabled and message forwarding being disabled.

The communications module 324 is used for setting up wireless communications with the home gateway 114 via which the mobile device 300 communicates one or more messages to the application server 140 as discussed. The communications module 324 uses the communications routines 316 which implement the various communications protocols supported by the mobile device 300 to set up communications with other devices. The module 324 is further configured to control the transmitter 304 and receiver 302 to transmit and receive messages from other devices in accordance with the methods of the invention. For example the communications module 324 controls the transmitter 304 to send the second response message 260 to the mobile device Y 110 in response to said first message 252, the second response message 260 including at least some content from the first response message 259 and indicating said mobile communications device 300 as the source of said second response message. The communications module 324, in various embodiments, controls the transmitter 304 to transmit information including, e.g., signals, messages etc., to a cellular base station such as BS 109 in accordance with the first communications protocol.

The control module 320 uses control routines 318 to control the operation of mobile device 300 and/or one or more elements therein. The message generation module 326 is responsible for generating one or more messages in accordance with the invention. For example, the message generation module 326 generates a copy of the first message 252, e.g., message 253, forwarded to the application server 140. The message generation module 326 also generates a second response message 260 from, or using the user composed reply message 259 (also referred to as the first response message 259) received by mobile device 300 from the IC TV 118.

Received message processing module 328 is used, as the name suggests, for processing the messages, signals and/or information received by the mobile device 300 from various other devices. For example, the received message processing module 328 is used for processing the first response message 259 sent from the IC TV 118 and generating the second response message 260 including at least some content from the first response message 259 and information that identifies the user's mobile communications device 300 as the source of the second response message 260. In addition, one or more messages, e.g., the first response message 259, are processed by the message processing module 328 for format conversion to put them in an appropriate format, e.g., format/protocol conversion, before the message can be sent out from the mobile device 300. For example in the FIG. 2 embodiment, the first response message 259 from IC TV 118 is in a different format, e.g., WiFi format, than the second response message 260. Such format conversion is performed in some embodiments, by the message processing module 328.

Data/information 340 includes a plurality of stored sets of data/information including stored information 342, directory of contacts 344, generated copy of first message 346, other stored received message(s) 348, and user settings and message forwarding control information 350. Stored information 342 includes information identifying the application server 140 to which one or more messages are to be forwarded in accordance with the invention. The information identifying the application server 140 may be, e.g., IP address corresponding to the application server 140. Directory of contacts 344 include information regarding contacts of the user of mobile communications device 300, e.g., friends, coworkers, family members etc. The contact information included in directory of contacts 344 may include telephone number(s), address, e-mail address etc., corresponding to various contacts of the user of mobile device 300.

In at least one embodiment the message forwarding control information 350 includes the address of the application server 140 as the destination address for forwarding one or more messages received on mobile device 300 (112) in accordance with one embodiment of the invention. In some embodiments the message forwarding control information also indicates when one or more messages received by the mobile device 1 112 are to be forwarded. In some embodiments the message forwarding control information 350 also indicates at least one time period during which one or more messages received by the mobile device 1 112 are to be forwarded, for example, forward received messages between 7:30 PM-9:30 PM during weekdays, between 6:00 PM-11:00 PM during weekends, etc. It should be appreciated that the message forwarding control information 350 can be easily modified or changed by the user as per the user's desire/preference.

Figure 4:
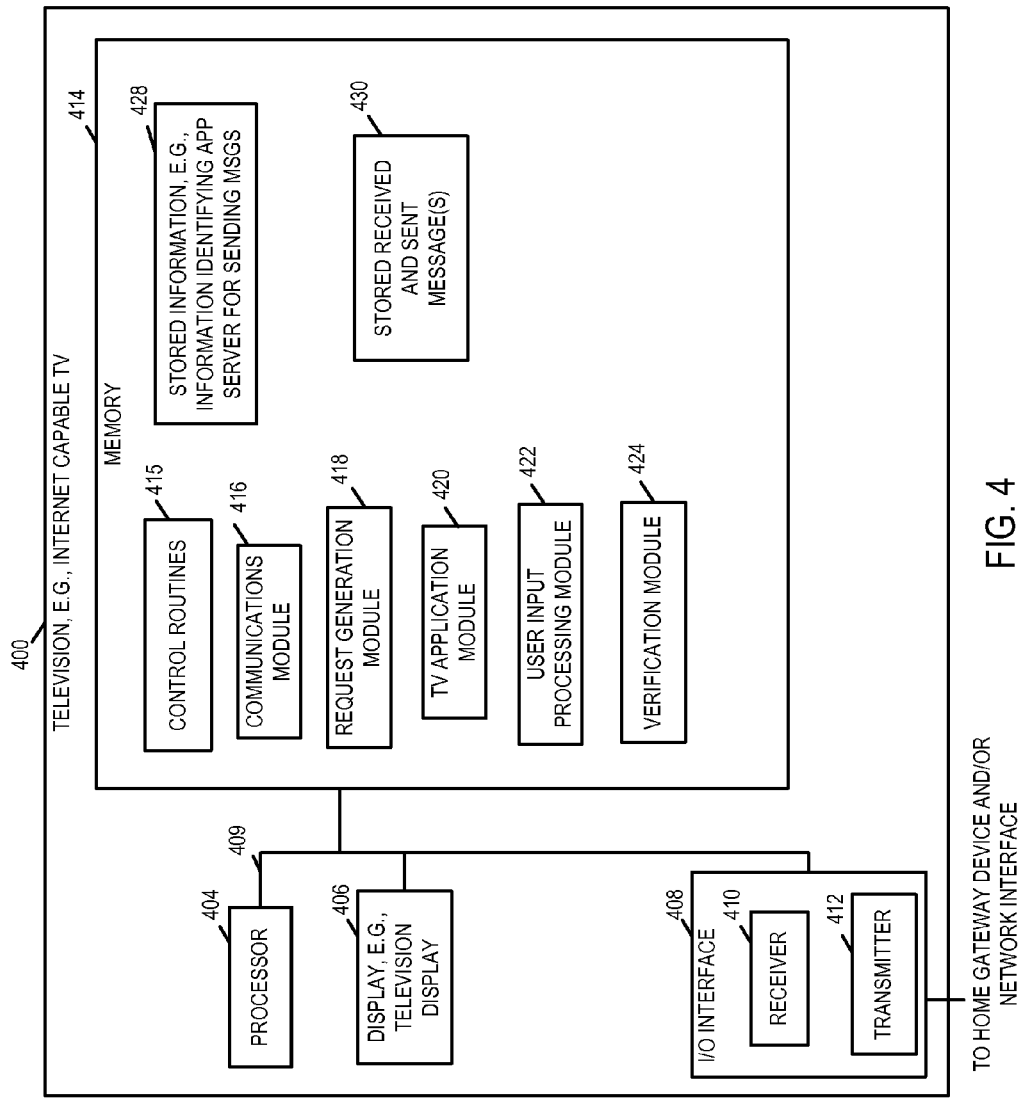
FIG. 4 illustrates an exemplary internet capable Television, in accordance with an exemplary embodiment of the invention.

FIG. 4 illustrates an exemplary internet capable Television (IC TV) 400 implemented in accordance with the invention. The exemplary IC TV 400 may be used as the IC TV 118 of the system 100 shown in FIG. 1. As illustrated, the IC TV 400 includes a processor 404, display 406, an I/O interface 408, and a memory 414 coupled together by a bus 409. The I/O interface 408 includes a receiver 410 and a transmitter 412. In some embodiments both the receiver 410 and transmitter 412 include wireless capabilities for receiving and transmitting respectively. The receiver 410 is responsible for receiving and processing messages, replies, information, content, e.g., image and audio content, and/or control signals while the transmitter 412 is responsible for sending, e.g., transmitting, messages, signals, replies and information. Both the receiver 410 and transmitter 412 work under the direction of the processor 404 which executes one or more of the routines and/or modules included in memory 414 to control the operation of various elements in the IC TV 400. Thus, via the I/O interface 408, the IC TV 400 can receive and/or send information, e.g., audio and video content, messages, commands, etc. The I/O interface 408 in some embodiments also includes an infrared signal receiver to receive signals from a user remote control device, e.g., remote control 122. Display 406 is a television display screen over which video, images and/or received message content is displayed to the user of IC TV 400.

The memory 414 includes control routines 415 which are executed by the processor 404 to control the overall operation of IC TV 400 or one or more elements therein, in accordance with the invention. Control routines 415 may operate in conjunction with various modules which are used to perform various functions. Modules included in the memory 414 include a communications module 416, a request generation module 418, TV application module 420, user input processing module 422, and verification module 424. The memory 414 also includes stored information 428, and received messages 430.

The communications module 416 includes the communications routines implementing the various communications protocols used by the IC TV 400. The IC TV 400 supports one or more communications protocols for communicating with other devices. For example in some embodiments the IC TV 400 supports communications protocols which enable the IC TV 400 to communicate with other devices, such as the home gateway 114, wirelessly and/or over a wired connection.

The TV application module 420 includes the exemplary TV application used by IC TV 400 for receiving one or more messages, e.g., SMS/MMS etc., forwarded from a user's mobile device such as mobile device 300, in accordance with the invention. The TV application module 420, when activated, controls the request generation module 418 to generate a request signal, e.g., HTTP push signal 251, and controls the transmitter 412 to transmit the generated request signal to the application server 140. As discussed, one or more received messages are forwarded to the IC TV 400 from the application server 140, in response to the request signal 251. When one or more forwarded messages are received, the TV application module 420 controls how the content of received messages are displayed on the television display 406 to the user of IC TV 400, e.g., in compliance with the user defined settings on IC TV 400 regarding displaying of received messages. In some embodiments the TV application module 420 presents interactive messages/prompts on the television display 406 for user action prior to displaying any received SMS/MMS messages to the user as discussed with regard to step 222. For example, the interactive messages/prompts presented to the user may invite user to enter a pin/password to view received messages, or may ask if the user likes to store messages for viewing sometime later.

The IC TV 400 includes an interface via which the user can compose a reply message, e.g., in response to the message displayed on display 406 which was received by the user's mobile device 112. In some embodiments the user composed reply message is received as part of the user input signal 258. The user composed reply message is processed by the user input processing module 422 to generate a first response message (shown as message 259 in FIG. 2) before being sent to the user's mobile device 1 112. The transmitter 412 is used to send the first response message 259 to the user's mobile device 1 112. The user input processing module 422 is also responsible for processing input received from the user remote control device 122 and acting upon the user instructions recovered from the received user input. For example, if the user selects to delete and/or store a received message, the user input processing module 422 performs the task of deleting and/or storing the message. In some embodiments the user input is an infrared signal communicating a text message, e.g., composed by the user.

Verification module 424 is responsible for verifying a password or pin entered by the user prior to displaying one or more received messages. Initially the user can store a password and/or pin of his choice while configuring the user settings via the TV application module 420. The verification module 424 compares the pin/password entered by the user when trying to view a received message with the original pin/password stored in the memory 414 by the user. When the verification module 424 determines that the pin/password entered by the user is valid, the message is displayed to the user.

Memory 414 further includes stored sets of information including stored information 428, and other stored received and sent message(s) 430. Stored information 428 includes information identifying one or more devices which facilitate sending and receiving messages on the IC TV 400 such as, for example, the application server 140 to which the request for messages is sent, home gateway 114, etc. The information identifying the application server 140 may be, e.g., IP address corresponding to the application server 140. Stored received and sent messages include the messages received on the IC TV 400 from the mobile device 1 112, and messages sent from the IC TV 400, e.g., reply messages.

Figure 5:
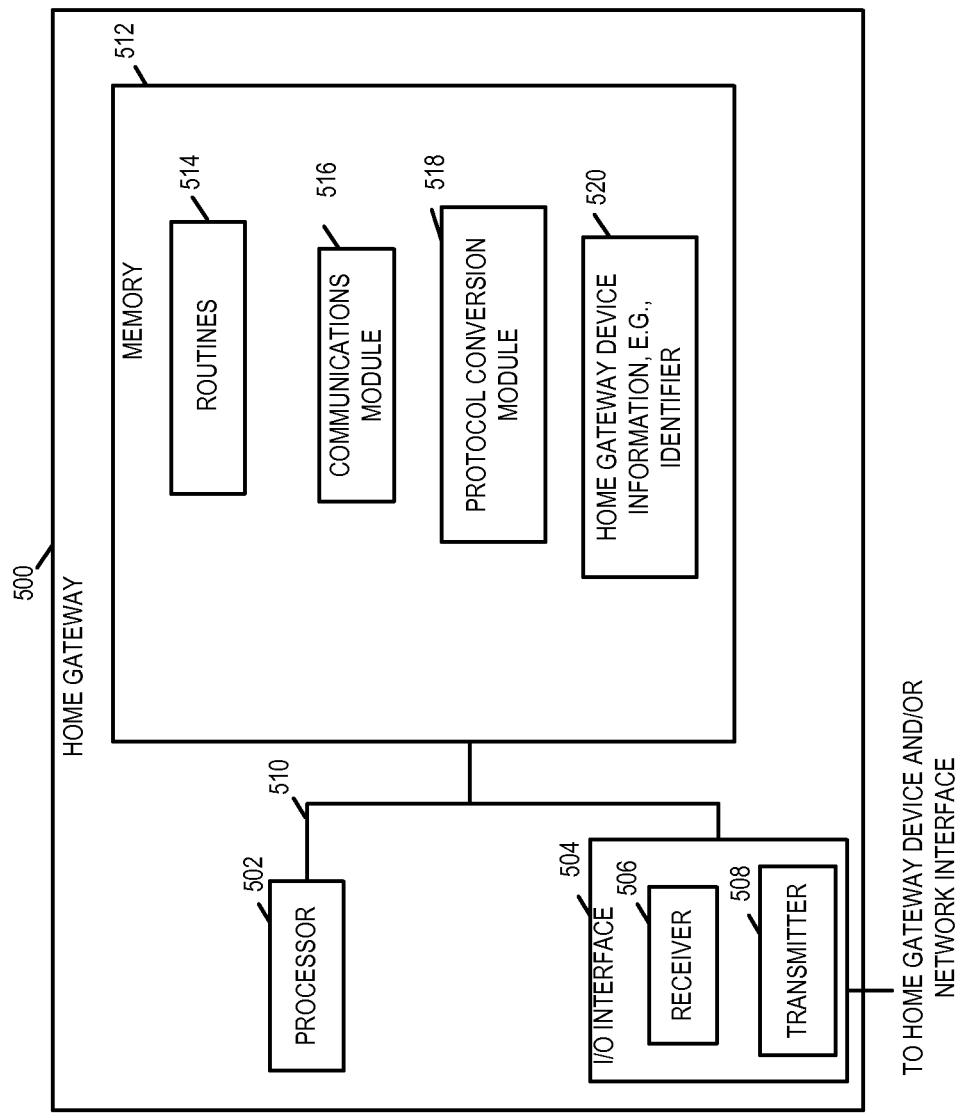
FIG. 5 illustrates an exemplary home gateway device implemented in accordance with one embodiment of the invention.

FIG. 5 illustrates an exemplary home gateway device 500 which can be implemented as the home gateway device 114 illustrated in FIG. 1. In one embodiment device 500 is implemented as a home gateway device which also has the capability to perform the functions discussed earlier with regard to the application server 140. As illustrated, the device 500 includes a processor 502, an I/O interface 504, and a memory 512 coupled together by a bus 510. The I/O interface includes a receiver 506 and a transmitter 508. As the name suggests, the home gateway device 500 acts as a gateway, e.g., between two or more devices within a customer premise (e.g., customer premise 104), and/or between the devices at a customer premise and the headend 102. The home gateway device 500 acts as a point of access to the cable network 176, e.g., internet, for one or more devices at the customer premise 104.

The receiver 506 is responsible for receiving and processing messages, and/or other information, from other communications devices. Both the receiver 506 and transmitter 508 work under direction of the processor 502 which executes one or more of the routines and/or modules included in memory 512 to control the operation of one or more elements in the home gateway device 500. The receiver 506 is configured to receive forwarded copy of one or more messages from the user's mobile device 1 112 as discussed. The transmitter 508 is used for transmitting information including messages, signals etc., from the home gateway device to one or more other devices within a customer premise, e.g., 104, or any other device/server located outside the customer premise. In some embodiments the transmitter 508 includes a wireless transmitter module. In some such embodiments wireless transmitter module is one of a WiFi transmitter and a Bluetooth transmitter.

The memory 512 includes routines 514 including the gateway device control routines and communications routines. The processor 502 executes routines 514 to control the operation of the home gateway device 500 in accordance with the invention. The memory 512 further includes a communications module 516, a protocol conversion module 518, and home gateway device information 520. The communications module 516, uses the communications routines implementing the various communications protocols supported by the home gateway device 500, to communicate with other devices. The home gateway 500 supports one or more communications protocols for communicating with other devices.

The communications module 516 allows the home gateway 500 to establish communications with other devices using various communications protocols supported by the gateway device 500. For example the communications module 516 enables the home gateway 500 to communicate with other devices wirelessly, e.g., using WiFi, Bluetooth, and/or over a wired connection. In one embodiment, the home gateway 500 can communicate with the user's mobile device 1 112 over a wireless channel, while communicate with the IC TV 118 over a wired connection, e.g., Ethernet.

The protocol conversion module 518 is used for converting signals and/or messages which are in accordance with a first communications protocol/format to signals and/or messages in accordance with a second communications protocol/format. For example, a message received from the IC TV 118, intended to be sent to the user mobile device 1 112, may be in a first format and comply with a first communications protocol. However such a message, in some embodiments, needs a protocol/format conversion in order to be sent to the mobile device 112 from the home gateway device 500. In such embodiments the protocol and/or format conversion is performed by the protocol conversion module 518. It should be appreciated that even though the message format or the communications protocol used for communicating the message may be changed for transmission purposes, the message content, e.g., the payload, however remains the same.

Home gateway device information 520 may include, e.g. a user ID corresponding to a user of the home gateway 500, Media Access Control (MAC) address of the home gateway 500, etc. and or other information stored in the home gateway memory which can be used to identify the home gateway device 500 and/or control device operation or settings. In various embodiments, the MAC address is used for routing information, e.g., messages, signals, etc., to the home gateway 500.

Figure 6:
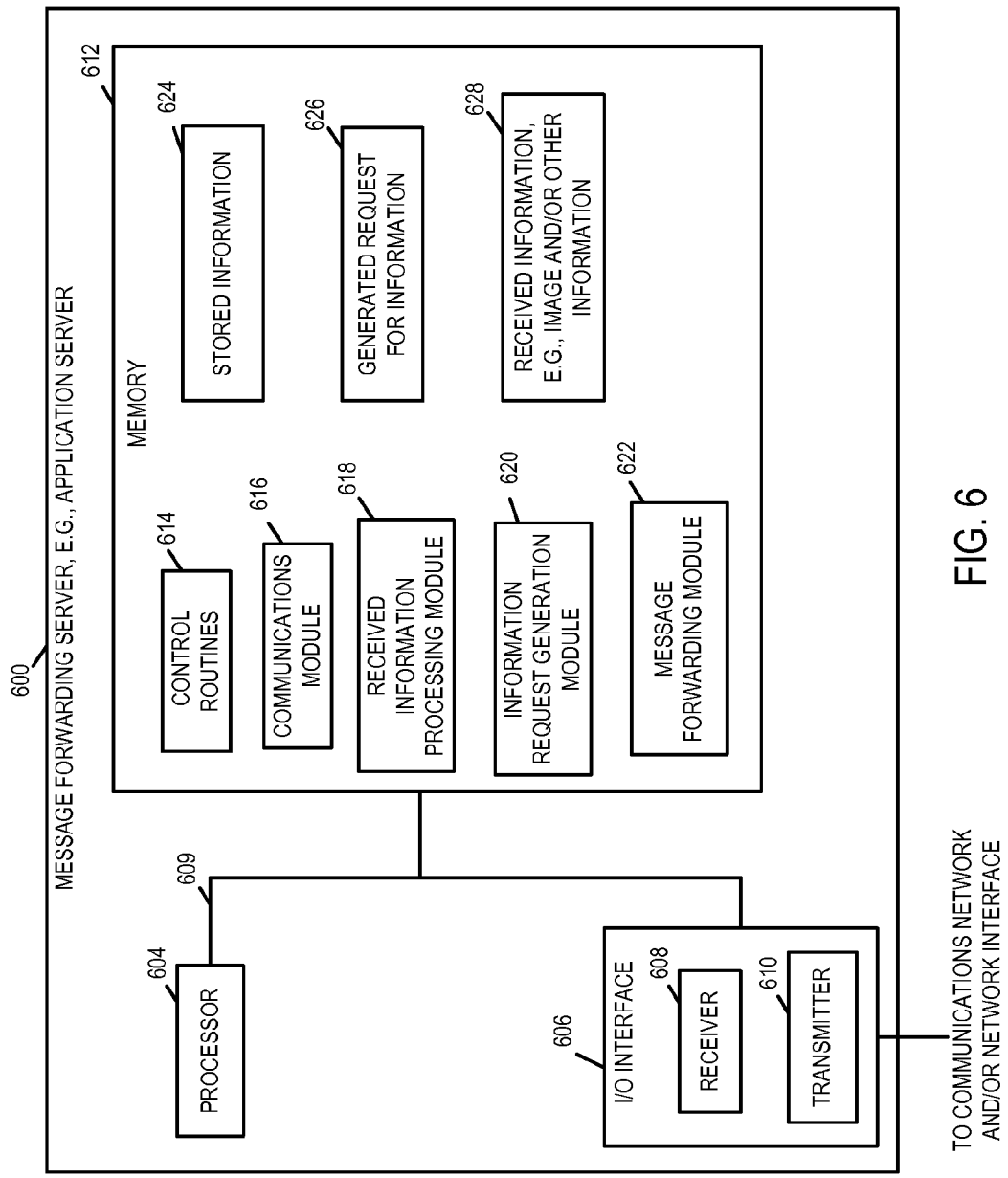
FIG. 6 illustrates an exemplary message forwarding server implemented in accordance with one embodiment of the invention.

FIG. 6 illustrates an exemplary application server 600 implemented in accordance with the invention. The exemplary application server 600 may be used as the application server 140 shown in FIGS. 1 and 2. As illustrated, the application server 600 includes a processor 604, an I/O interface 606 including a receiver 608 and a transmitter 610, and a memory 612 coupled together by a bus 609. Via the I/O interface 606 the application server 600 can receive and/or send information including, e.g., messages, commands, signals etc. The I/O interface 606 includes the receiver 608 which is responsible for receiving and processing information, e.g., messages, requests, and/or control signals. The transmitter module 610 is responsible for generating and sending messages, replies and information. Both the receiver 608 and transmitter 610 work under direction of the processor 604 which executes one or more of the routines and/or modules included in memory 612.

The memory 612 includes system control routines 614 which control overall application server operation in accordance with the invention. Control routines 614 may operate in conjunction with various modules which are used to perform various functions. Modules included in the memory 612 include a communications module 616, received information processing module 618, information request generation module 620, and a message forwarding module 622.

The communications module 616 includes communications routines implementing the communications protocols supported by the application server 600, to communicate with other devices. The received information processing module 618 is responsible for processing received messages, e.g., message 253, from the various mobile devices, e.g., mobile device 1 112, and other information regarding the sender of the message which the application server 600 receives (e.g., message 255) from the address book server and/or web services 142. In various embodiments the messages, e.g., SMS, MMS etc., received at the application server 600 are forwarded by the mobile devices as discussed earlier in the FIG. 2 example. In the example discussed in FIG. 2, the original sender of the first message 252 is the user of mobile device Y 110. The received information processing module 618 performs processing on the forwarded message 253 to recover sender information, e.g., telephone number corresponding to the sender of original message, included in the forwarded message 253. The received information processing module 618 also processes information received from the address book server and/or web services 142 to recover additional information, e.g., such as name, a picture, ICON, location, map, web page, etc., corresponding to the sender of original message user of mobile device Y 110. The recovered information is stored in the memory as received information 628 and is forwarded along with the content of the forwarded message 253, to the IC TV 118.

The information request generation module 618 is responsible for generating a request for information about the sender of the message 252, e.g., user of mobile device Y 110, forwarded from the mobile device 1 112 to the application server 600. The generated request for information 626 is an output of the module 620. The generated request for information 626 is sent from the application server 600 to the address book server and/or web services 142. This is shown in FIG. 2 example as request 254.

The message forwarding module 622 controls forwarding of one or more messages, e.g., message 253, received form a user's mobile device, e.g., mobile device 1 112, to the IC TV 118 and/or STB 116. The message forwarding module 622 in some embodiments is configured to forward the message 253 along with the additional received information 628 regarding the sender of the original message 252, in accordance with the invention.

Stored information 624 includes information regarding customers and/or various communications devices from which the application server 600 has received massages and/or requests in the past. For example, when the application server receives a request for messages from IC TV 118, it may store device identification information and/or associated customer information corresponding to the IC TV 118. Similarly information such as, e.g., pictures, social website profile, etc., corresponding to a customer, received from the address book server and/or web services 142 may also be stored in the memory 612 as stored information 624. The various modules and information stored in the applications server 600 can be used to implement one or more steps of the method of the present invention.

Figure 7:
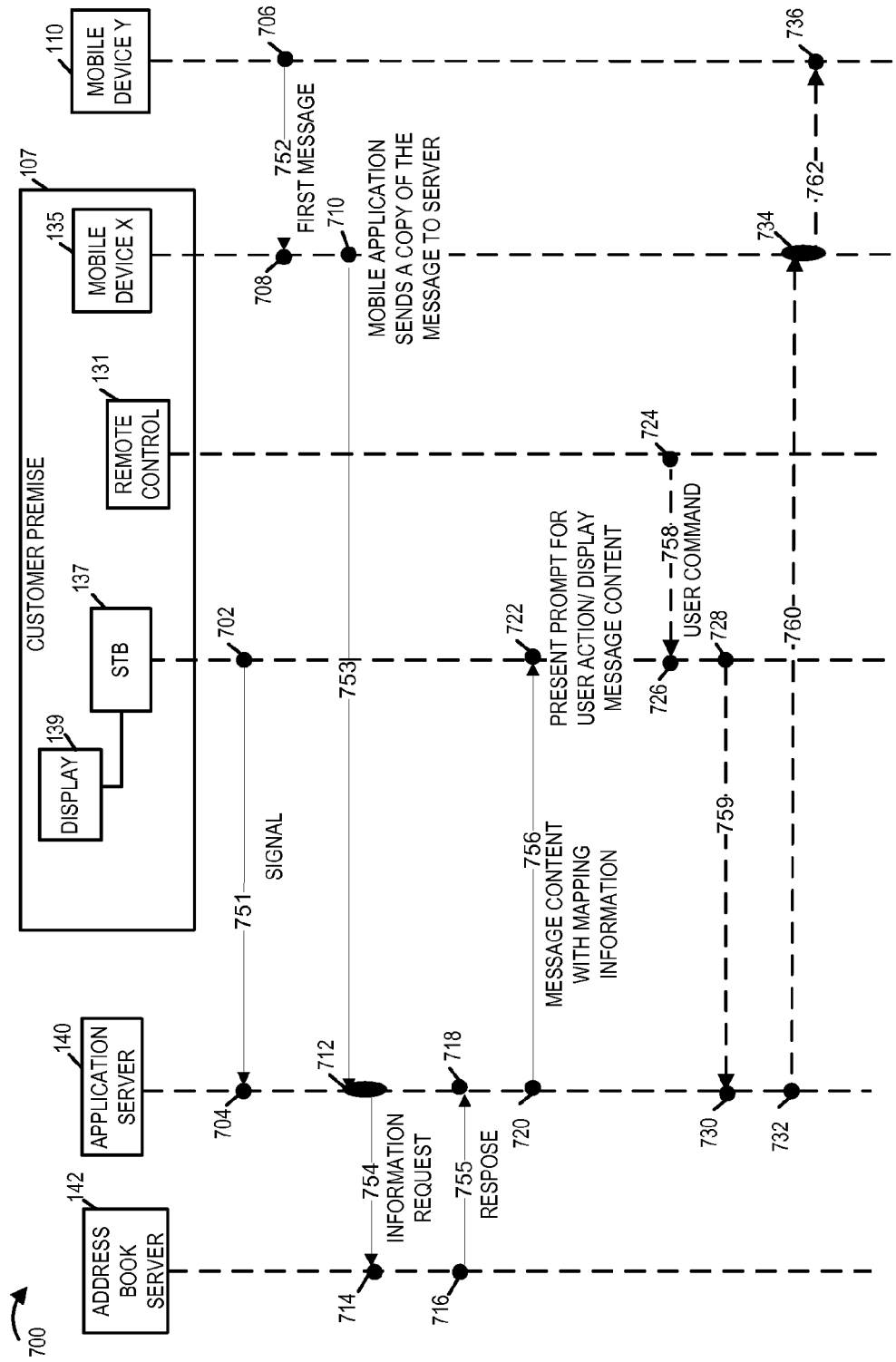
FIG. 7 illustrates signaling performed in accordance with another exemplary embodiment implemented using the system shown in FIG. 1.

FIG. 7, illustrates an alternative embodiment to the FIG. 2 embodiment. The exemplary embodiment shown in FIG. 7 is implemented with a set top box which does not support Internet Protocol (IP) communications, e.g., a legacy set top box. In one such embodiment the set top box STB 137 is an analog STB device however, the invention is not limited to analog set top boxes. The STB 137 is connected to the service provider's cable network 176, e.g., a hybrid fiber-coaxial (HFC) network, as shown in FIG. 1.

At the top of FIG. 7, various elements 700 of the system 100 which may participate in facilitating communication of one or more messages from a user mobile device, e.g., mobile device y 110, to the STB 137 at the customer premise 107 for display on the television display 139, in accordance with one embodiment of the invention, are shown. The illustrated components 700 include, the mobile device Y 110, mobile device X 135, STB 137, display device 139, remote control 131, application server 140 and address book server 142. The signaling illustrated in the example of FIG. 7 is similar to the signaling of FIG. 2 example. However it should be appreciated that in the particular embodiment discussed with regard to FIG. 7, the STB 137 is a STB device which does not support IP signaling and the signals and/or messages to and/or from the STB 137 are communicated over the cable network 176, e.g., HFC network using non-IP based communications protocols.

Similar to the example discussed with regard to FIG. 2, in FIG. 7 example a user of the mobile communications device (MS) Y 110 sends a first message, e.g., an SMS or MMS, to the user of mobile device X 135 and the first message received on the user mobile device X 135 is forwarded to the STB 137 and is displayed to the user on the display device 139, e.g., a television.

The mobile device X 135 includes an exemplary message forwarding application which when activated allows the user of mobile device X 135 to forward one or more messages received on the mobile X 135 to the STB 137 for display to the user on the display device 139. It should be appreciated that the STB 137 is coupled to the service provider's network, which in this particular embodiment where legacy STB device is used is, e.g., an HFC network 176. In accordance with one aspect of the invention the STB 137 includes an exemplary message application which allows the STB 137 to receive messages forwarded by the application server 140.

The process starts in step 702 where the message application on the STB 137 initiates a push connection to application server 140 by sending a request for messages (shown as signal 751) to the application server 140. The request 751 is sent when the message application is activated on the STB 137. The message application may be activated, e.g., by a user input through remote control 131. In some embodiments the user may configure the STB 137 such that the message application is activated upon initialization of the STB 137, e.g., when STB 137 is powered on.

The request is received by the application server 140 in step 704 and stays pending with the application server 140 until the application server 140 receives a message corresponding to the pending request 751, e.g., a message forwarded by the mobile X 135. In some embodiments the request signal 751 is not used and the application sever 140 is configured by an administrator of the cable network, via a provisioning computer system, to forward messages to the STB 137. In one such embodiment the signal 751 may not be used with the configuration of the service, storage of records and storage of control information in the cable network headend used to implement the service being performed at the network headend as part of provisioning and/or configuration of the cable network to provide one or more services to the user of STB 137.

The application server 140 may, and normally does, include a record, e.g., stored information, which maps various user devices such as the STB 137 and mobile devices, as identified by their phone number or another identifier such as a MAC address, associated with a customer, to corresponding customer identification information, e.g., a customer account number, customer name or other identifying information.

For discussion purposes, consider an example where the user of mobile device X 135 receives a first message 752, e.g., an SMS, MMS etc., from a friend, e.g., user of mobile device Y 110. This is illustrated in steps 706 and 708. The first message 752 is sent from the mobile device Y 110 in step 706 and is received by the MS X 135 in step 708. Although not shown, it should be appreciated that communications of messages between the mobile devices MS Y 110 and MS X 135 is facilitated in various embodiments through one or more mobile networks including base station(s) such as mobile network(s) 108 including base station 109. In some embodiments the messages can be communicated directly between mobile devices in a peer to peer manner. Messages normally include the phone number of the destination device to which the message is directed and also the phone number of the device which is sending the message. For the purpose discussion, consider that the mobile device X 135 is located at the customer premise 107 when the first message 252 is received in step 708, that the message forwarding application is activated on the mobile device X 135, and that the message application is activated on the STB 137.

Following the receipt of the first message 752 in step 708, in accordance with the invention the message forwarding application in mobile device X 135 forwards a copy (message 753) of the first message 752 to the application server 140. This is illustrated in step 710. The copy 753 of the first message is sent to the application server 140 via mobile network(s) 108 including base station 109. In one embodiment the copy 753 is communicated from the mobile device X 135 to the base station 109 and from base station 109 to the application server 140, e.g., over the internet. In various embodiments the mobile device 1 112 includes message forwarding control information which is used by the message forwarding application on mobile device X 135 to forward the copy of the first message to the application server 140. The message forwarding control information in some embodiments is stored by the user in the mobile device X 135, e.g., as part of installing/setting up the message forwarding application on mobile device X 135. In at least one embodiment the message forwarding control information includes the address, e.g., IP address, of the application server 140 as the destination address for forwarding one or more messages received on mobile device X 135 in accordance with one embodiment of the invention. The message forwarding control information has been discussed earlier in detail with regard to FIG. 2 embodiment, and thus it will not be discussed again here.

The application server 140 receives the forwarded copy 753 of the first message in step 712 and processes the received message. In various embodiments processing of the message 753 includes checking the identification information corresponding to the original sender, e.g., phone number of the mobile device Y 110 which sent the first message 752, to determine if the application server 140 has some additional information, e.g., such as a name, a picture, ICON, location, map, web page, etc., corresponding to the original sender of the first message 752, i.e., user of mobile device Y 110. Some such information may already be stored in the application server 140, e.g., due to searches or look up performed by the application server 140 using the phone number of the mobile device Y 110.

In some embodiments when the additional information corresponding to the original sender, e.g., mobile device Y 110, is not already available to the application server 140, the information in such cases may be requested from the address book server and/or web services 142 as discussed in FIG. 2 example in steps 212, 214, 216, and 218 detail. Processing in steps 712, 714, 716, and 718 is similar to the processing discussed in steps 212, 214, 216, and 218 and therefore steps 712, 714, 716, and 718 are not discussed in detail.

In step 720, after having obtained information corresponding to the original sender of the first message 752, e.g., the user of mobile device Y 110, the application server 140 sends a message 756 including the content of the first message 752 along with the mapping information corresponding to the original sender, to the STB 137. The message 756 is in response to the request 751 in embodiments where request message 751 is used. Thus, the application server 140 in some embodiments, acts as a message forwarding server that receives messages forwarded by the user mobile device X 135 and then forwards them, optionally along with additional mapping information or source related information obtained from an Internet search or a database, to the STB 137.

The response message 756 is received and processed by the message application in the STB 137 in step 722. As part of the processing performed in step 722, The STB 137 presents a prompt on the display device 139, e.g., the television display coupled to STB 137, requesting the user to take action, e.g., to view the received message content, store for later viewing, decline to view, etc. In some embodiments the user at customer premise 104 is prompted to enter a password or pin in order to view the received message. The configuration settings regarding how one or more received messages on the STB 137 should be displayed to the user on the display 139 can be changed as per the user's preference. In such embodiments, prior to displaying the content of the received message, a check is performed by the message application on the STB 137 to verify whether the password- or pin entered by the user to view the received message is correct. Assuming that the user entered pin or password is correct, further in step 722, the content of the first message 752 is displayed on the display 139 to the user along with other information, e.g., name and/or picture, icon etc., corresponding to the sender, e.g., user of mobile device Y 110. An identifier of the mobile device X 135 such as its telephone number may also be displayed so that the STB user is aware of which one, which mobile phone, of a plurality of user devices associated with the STB the displayed message was originally sent to by mobile device Y 110

After displaying the message, the STB 137 waits for a user command to perform further processing regarding the displayed message. In some embodiments when no user command or instructions is detected the STB 137 automatically stores the content of the first message 252 displayed to the user. The user at customer premise 107 can later find the message in a message inbox directory stored on the STB 137 and retrieve or delete the message from the message store in the STB 137 as desired.

The signals/messages shown using dashed arrows correspond to optional steps 724, 728, 732 and 734 and thus some of such steps may be performed in some embodiments while skipped in some other embodiments. For the purpose of FIG. 7 example, consider that the optional steps 724, 726, 728, 730, 732, 734 and 736 are performed. In step 724, after having viewed the message displayed on display device 139 in step 722, the user sends a user input signal 758, e.g., a command, via the remote control 131 to control the STB 137. The user command 758 is processed is processed by the message application on the STB 137. The command 758 may instruct the message application to, for example, store the received message and return to the previous screen; delete the received message, store the message, and open a window for the user to compose a reply message, etc. The STB 137 receives the command in step 726 and acts according to the instruction. Steps 728 and 730 are performed in the event when the user at customer premise 107 decides to reply to the received message which is displayed. Message viewing, deletion, and/or information may and in some embodiments is, sent from the STB 137 via the application sever 140 to the mobile device X 134 which then updates the message information in the mobile device X to delete or mark the message(s) as having been viewed thereby maintaining synchronization between the message information on the STB 137 and the cell phone X 134. For the purpose of discussion, consider that the user at customer premise 107 wishes to compose and send a reply in response to the received first message 752. Upon receiving the command in step 726 the message application in the STB 137 controls the STB 137 to display a window on the display device 139 for the user to compose the reply message. In some embodiments the user composed reply message is received as part of the user input 758. The reply message is accepted by the message application on the STB 137 in step 726 and is used to generate a first response message 759 to be sent to mobile device X 135.

Next in step 728 the first response message 759 composed by the user at customer premise 107 is sent from the STB 137 to the application server 140. The message application on the STB 137 controls the STB 137 to communicate the first response message 759 to the application server 140. The first response message 759 is communicated from STB 137 to the application server over the cable network 176. The first response message 759 may include information indicating that the message is intended to be communicated to the user's mobile device X 135 and may include, e.g., the telephone number of mobile device X as well as the telephone number of mobile device Y to which the response is to ultimately be sent. The application serve 140 receives the first response message 759 in step 730. In step 732 communicates the application server 140 forwards the response message 759 to the mobile device X 135.

The mobile device X 135 receives the response message 759 in step 734 and performs processing. As part of the processing in step 734, a second response message 760 is generated by the mobile device X 135 from the received reply message 759. The second response message 260 includes at least some content from the reply message 259, e.g., the content of the message composed by the user, and indicates the user's mobile device X 135 as the source of the second response message 760. In some embodiments the second response message 760 is in a different format than the reply message 759. Further in step 734 the second response message 760 is transmitted over the air to the sender of the first message 752, i.e., to mobile device Y 110. The transmission may be via a cellular base station. In step 736 the mobile device Y 110 receives the second response message 760 which is in response to the first message 752. A message log maintained by mobile device X 135 includes the second response message 760, e.g., in a sent messages folder.

Various embodiments are possible beyond those which have already been described and the invention is not limited to the particular examples which have been discussed above. Various exemplary embodiments will now be discussed.

An exemplary method in accordance with some embodiments of the invention comprises: displaying content of a first message that was received by a user's mobile communications device, e.g., mobile device 112, on a television display; receiving user input, said user input being a response to said content of said first message which is displayed; generating a first response message from said received user input; and sending the first response message to said user's mobile communications device. In some embodiments the user input is received at one of a television, e.g., IC TV 118, and a set top box, e.g., STB 116. In some cases the television display is one of: a display device coupled to a set top box, or a display included in the internet enabled TV such as IC TV 118. Thus in some embodiments the first message received by a user's mobile is forwarded to the IC TV 118 and the message content is displayed on the television display (406) included in the IC TV 118. In some embodiments the first message received by a user's mobile is forwarded to the set top box 116 and the message content is displayed on the television display 120 coupled to the set top box 116. In some embodiments the user input is received from a wireless remote control, e.g., remote control 122. In some embodiments the input is an infrared signal communicating a text message from said user.

In some embodiments the exemplary method includes sending, prior to displaying content of the first message, a request for messages from a television or set top box corresponding to said television display to a message forwarding server, e.g., application server 140; and receiving, in response to the request, a forwarded version of the first message from the message forwarding server. In some embodiments the forwarded version of the first message is generated from a copy of the first message sent to the message forwarding server from the user's mobile communications device.

In some embodiments the exemplary method further includes receiving with the forwarded version of said first message, information about the original sender of the first message retrieved by said message forwarding server from one of stored information and the Internet. In some embodiments the request for messages is a long-poll request message (e.g., XMLHttpRequest), and the forwarded version of the first message is sent after receipt, by the message forwarding server, of the request for messages and a copy of the first message from the user's communications device.

In some embodiments sending the first response message to the user's mobile communications device includes sending the first response message to a wireless transmitter for transmission over the air to said user's mobile device. In some embodiments the wireless transmitter is located at a customer premise location e.g., user's home, at which said television display is located. In some embodiments the wireless transmitter is one of: a transmitter located in the television, e.g., included in IC TV 118, a transmitter located in said set top box 116, or a transmitter located in a gateway, e.g., home gateway 114. In some embodiments the wireless transmitter is one of a WiFi transmitter and a Bluetooth transmitter.

In some embodiments the method further includes sending, from the user's mobile communications device, a second response message in response to the first message, the second response message including at least some content from the first response message and indicating (e.g., using the mobile device's telephone number as a sender identifier) the user's mobile communications device as the source of said second response message. In some embodiments the second response message is one of a SMS and MMS message.

In some embodiments the method further includes receiving, prior to displaying content of the first message, the message content from a server which received said first message content from the user's mobile communications device. In some embodiments the method further includes operating the message forwarding server to retrieve information corresponding to the sender of said first message. In some embodiments operating the server to retrieve information includes operating the server to access at least one of stored information (e.g., stored in an address book server 142) or the Internet to retrieve said information corresponding to the sender.

In some embodiments the sender is identified by a telephone number in the first message. In some embodiments the step of operating the server to access at least one of said stored information or the Internet includes performing an information look-up operation based on the sender telephone number. In some embodiments the method further includes receiving with said message content, information retrieved by said server, corresponding to the sender of said first message. In some embodiments the information is one of a picture or content of a social media website corresponding to the sender of the first message.

In some embodiments the method further comprises prompting the user to enter a password or pin prior to displaying content of the first message that was received by said user's mobile communications device on a television display, and checking to determine that a valid password or pin was entered. In some embodiments the method further comprises storing message forwarding control information in the user's mobile communications device. In some the message forwarding control information indicates when messages received by said user's mobile communications device are to be forwarded. In some embodiments the message forwarding control information indicates at least one time period during which messages are to be forwarded. In some embodiments the message forwarding control information is set by the user and indicates one of message forwarding being enabled and message forwarding being disabled. Various steps discussed in the exemplary method above may be implemented by different devices/elements shown in the system of FIG. 1.

An exemplary system in accordance with some embodiments of the invention comprises: a display device for displaying content of a first message that was received by a user's mobile communications device; a receiver for receiving user input, said user input being a response to said displayed message content; a processing module for generating a first response message from said received user input; and a transmitter for sending the first response message to said user's mobile communications device. The exemplary system in some embodiments is one of i) a television including the display device, receiver, processing module and transmitter, e.g., IC TV 118, or ii) a combination of: a set top box including the receiver, the processing module and the transmitter, e.g., STB 116, and the display device.

In some embodiments the receiver is configured to receive input from a wireless remote control, e.g., remote control 122. In some embodiments the receiver includes an infrared signal receiver configured to receive an infrared signal communicating a text message from the user, e.g., the customer at customer premise 104. In some embodiments the system further includes a request generation module for generating a request for messages, and an application module for controlling the transmitter to send said request for messages to a message forwarding server, e.g., application server 140. In some embodiments the receiver is further configured to monitor for a response to said request for messages including a forwarded version of the first message from the message forwarding server.

In some embodiments the receiver is further configured to receive, with said forwarded version of said first message, information about the original sender of said first message retrieved by said message forwarding server from one of stored information and the Internet. In some embodiments the information about the original sender of said first message is, e.g., one of a picture or content of a social media website corresponding to the sender of the first message.

In some embodiments the application module is configured to prompt the user to enter a password or pin, prior to the content of the first message being displayed. The system further includes a verification module for verifying the validity of the password or pin entered by the user.

An exemplary mobile communications device in accordance with some embodiments comprises a receiver for receiving a first message from another mobile device using a first communications protocol, and an application module for forwarding a copy of said first message. The mobile communications device further includes a transmitter for transmitting the copy of the first message, using a second communications protocol which is different from said first communications protocol, to a message forwarding server. In some embodiments the mobile communications device further comprises a communications module for controlling said transmitter to transmit information to a cellular base station in accordance with the first communications protocol. In some embodiments the first communications protocols is a cellular network communications protocol and the second communications protocols is a WAN communications protocol, LAN communications protocol or personal area network protocol.

In some embodiments the first message is received by the mobile communications device in a first format. In some embodiments the mobile communications device includes a message generation module for generating a copy of the first message prior to forwarding.

In some embodiments the receiver is configured to receive a first response message from one of a television and a set top box. In some embodiments the first response message is sent from the television, e.g., IC TV 118, after the content of said first message is displayed to a user of the television. In another embodiment the first response message is sent from a set top box, e.g., STB 116, after the content of said first message is displayed, e.g., on a display device, to the user of the set top box. In some embodiments the communications module controls transmitter to send a second response message to the mobile device which sent the first message, in response to said first message. In some embodiments the second response message includes at least some content from the first response message and indicating said mobile communications device as the source of said second response message. The exemplary mobile communications device can be used as any one of the mobile devices 110, 112 and 124.

In the above described methods, in some embodiments, each step may be performed by one or more different software instructions executed by a computer processor, e.g., a central processing unit (CPU). At least one system implemented in accordance with the present invention includes a means for implementing each of the various steps which are part of the methods of the present invention. Each means may be, e.g., an instruction, processor, hardware circuit and/or combination of elements used to implement a described step.

Many of the above described methods or method steps can be implemented using machine, e.g., computer, executable instructions, such as software, included in a non-transitory machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A communications method, comprising:
    displaying, content of a first message sent from a first mobile communications device that was received by a second mobile communications device to which the first message was directed, on a television display;
    receiving, at a television or a set top box, user input via an interface, said user input being a response to said content of said first message which is displayed;
    generating, at said television or set top box, a first response message from said received user input including response information to be sent to said first mobile communications device; and
    sending, from said television or set top box, the first response message to said second mobile communications device for use in generating a response to said first message.

2. The method of claim 1, wherein receiving user input includes receiving input from a wireless remote control.

3. The method of claim 1, further comprising:
    prior to displaying content of said first message, sending a request for messages from said television or set top box corresponding to said television display to a message forwarding server; and receiving, in response to said request, a forwarded version of said first message from said message forwarding server.

4. The method of claim 3, wherein said forwarded version of said first message is generated from a copy of the first message sent to said message forwarding server from said second mobile communications device.

5. The method of claim 3, further comprising:
receiving with said forwarded version of said first message, information about the original sender of said first message retrieved by said message forwarding server from one of stored information and the Internet.

6. The method of claim 3,
wherein said forwarded version of said first message is sent after receipt, by said message forwarding server, of said request for messages and a copy of the first message from said second communications device.

7. The method of claim 2, wherein said input is an infrared signal communicating a text message from said user.

8. The method of claim 1, wherein sending the first response message to said second mobile communications device includes:
sending said first response message to a wireless transmitter for transmission over the air to said second mobile communications device.

9. The method of claim 8, wherein said wireless transmitter is located at a customer premise location at which said television display is located.

10. The method of claim 9, wherein said wireless transmitter is one of: a transmitter located in said television, a transmitter located in said set top box, or a transmitter located in a gateway.

11. The method of claim 1, further comprising:
prior to displaying content of the first message, receiving said message content from a server which received said first message content from the second mobile communications device.

12. The method of claim 11, further comprising:
operating said server to retrieve information corresponding to the sender of said first message.

13. A system comprising:
a display device for displaying content of a first message sent from a first mobile communications device that was received by a second mobile communications device to which the first message was directed;
a receiver, included in a television or a set top box, for receiving user input, said user input being a response to said displayed message content;
a processing module, included in said television or set top box, for generating a first response message from said received user input including response information to be sent to said first mobile communications device; and
a transmitter, included in said television or set top box, for sending the first response message to said second mobile communications device for use in generating a response to said first message.

14. The system of claim 13, wherein said system is one of: i) said television including said display device, said receiver, said processing module and said transmitter, or ii) a combination of said set top box including said receiver, said processing module and said transmitter, and said display device.

15. The system of claim 14, wherein said receiver is configured to receive input from a wireless remote control.

16. The system of claim 13, further comprising:
a request generation module for generating a request for messages; and
an application module for controlling said transmitter to send said request for messages to a message forwarding server.

17. The system of claim 16, wherein said receiver is further configured to monitor for a response to said request for messages including a forwarded version of said first message from said message forwarding server.

18. A first mobile communications device comprising:
a receiver for receiving a first message from a message sender, said first message being a message sent by the message sender from a second mobile communications device using a first communications protocol;
an application module for forwarding a copy of said first message; and
a message generation module for generating a second response message from a first response message received by said first mobile communications device, said first response message being from a device which received the forwarded copy of said first message, said second response message being in response to said first message and indicating the first mobile communications device as the sender of the second response message.

19. The mobile communications device of claim 18, further comprising:
a transmitter for transmitting said copy of said first message, using a second communications protocol which is different from said first communications protocol, to a message forwarding server responsible for communicating said copy of said first message to a set top box.

20. The mobile communications device of claim 19, further comprising:
a communications module for controlling said transmitter to transmit said second response message to a cellular base station in accordance with the first communications protocol.

* * * * *